W. V. TURNER.
ELECTROPNEUMATIC BRAKE.
APPLICATION FILED JULY 18, 1911.
1,087,997.
Patented Feb. 24, 1914.
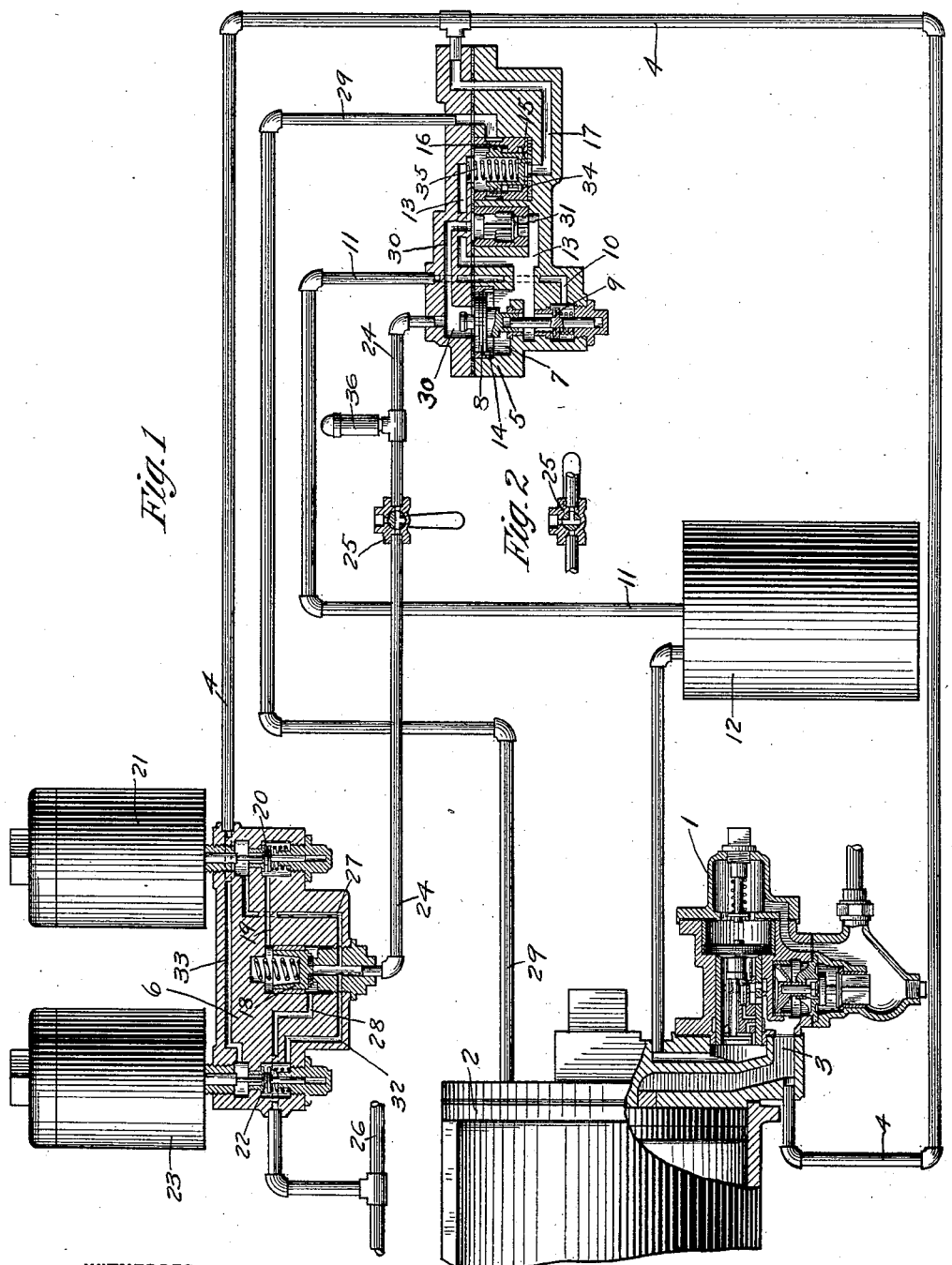
WITNESSES
INVENTOR
Walter V. Turner
by Wm. M. Cady
Atty.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

ELECTROPNEUMATIC BRAKE.

1,087,997.  Specification of Letters Patent.  Patented Feb. 24, 1914.

Application filed July 18, 1911. Serial No. 639,185.

*To all whom it may concern:*

Be it known that I, WALTER V. TURNER, a citizen of the United States, residing at Edgewood, in the county of Allegheny and State of Pennsylvania, have invented new and useful Improvements in Electropneumatic Brakes, of which the following is a specification.

This invention relates to electro-pneumatic brakes, and more particularly to an equipment in which the pneumatic brakes may be controlled at one time electrically and at another time automatically by varying the pressure in the train pipe.

The principal object of my invention is to provide an improved equipment of the above character.

In the accompanying drawing, Figure 1 is an elevation, with certain parts sectioned, of an electro-pneumatic brake equipment embodying my invention and Fig. 2 a sectional view of the three-way cock in position for pneumatic operation.

According to my invention, the usual triple valve device 1 is not connected to supply and release air directly to and from the brake cylinder 2, but instead the brake cylinder passage 3 is connected by a pipe 4 to a double check valve device 5, so that said check valve controls communication to the brake cylinder.

An electrically controlled valve mechanism 6 is provided for effecting the admission and release of air to and from the brake cylinder electrically, and while the electric controlling means may be of any desired construction, I prefer to employ that shown in Fig. 1 of the drawing.

The double check valve device which is preferably employed comprises a casing having a chamber 7 containing a piston 8 for operating a valve 9 which controls communication from passage 10, pipe 11, and auxiliary reservoir 12 to passage 13. The piston 8 is also adapted, when fluid under pressure is supplied to one side, to be shifted to a position in which communication is established around the piston by way of by-pass grooves 14. Passage 13 opens into a chamber at one side of a double check valve 15, which normally is in a position uncovering a port 16 for establishing communication from passage 13 to pipe 29 leading to the brake cylinder 2. The opposite side of the double check valve 15 is connected by a passage 17 with pipe 4.

The electric controlling mechanism may comprise an application valve 18 having a passage 19 leading from one side thereof to a valve 20 adapted to be controlled by a magnet 21 and a release valve 22 adapted to be controlled by a magnet 23. Pipe 24 leads from the application valve 18 to passage 30 of the double check valve device and contains a three-way cock 25.

In order to control the brakes electrically, the three-way cock 25 is turned to the position shown in Fig. 1, in which communication is open through the pipe 24 from the electric valve mechanism to the double check valve device.

The source of fluid supply for the electric control is preferably the signal pipe line 26, usually employed on trains for signaling purposes and in making an electric application, the application magnet 21 is energized to open the pilot valve 20, so that fluid under pressure is vented from one side of the valve 18 to passage 27 which opens to pipe 24. The pressure of the supply source acting on the opposite side of the valve 18, through passage 28 and pipe 26, the valve is lifted from its seat so as to permit air to flow from passage 28 to pipe 24.

The pressure of air in pipe 24 moves piston 8 to open the by-pass grooves 14 and air then flows into passage 13 and thence through port 16 to pipe 29 and brake cylinder 2. The movement of piston 8 also lifts valve 9 from its seat and air is thereupon vented from the auxiliary reservoir 12 to passage 13. A slight reduction in auxiliary reservoir pressure is thus produced which prevents any possibility of the triple valve piston leaving normal release position during an electric application.

The piston 8 is held in open position until the brake cylinder pressure on one side is substantially equal to the supply pressure on the other side, then the piston moves to close the grooves 14 and the valve 9.

The brake cylinder pressure may be increased as desired by again energizing the magnet 21 and causing the application valve 18 to open. In order to release the brakes electrically, the release magnet 23 is energized to open the release valve 22, whereupon air is released from the brake cylinder by way of a release passage 30, containing a check valve 31, pipe 24, passage 32, past valve 22 to passage 33, which opens in pipe 4. As pipe 4 leads to brake cylinder passage 3 of the triple valve device 1, it will be evident that fluid is released from the brake cylinder through the usual triple valve exhaust port.

If the brakes are to be operated automatically, the three-way cock 25 is turned to the position shown in Fig. 2, in which the double check valve side of the pipe 24 is connected to the atmosphere. In an automatic application, fluid supplied from the auxiliary reservoir to the brake cylinder flows through pipe 4 to passage 17 of the double check valve device and operates the double check valve 15 so as to open communication from passage 17 through a port 34 to passage 16 and brake cylinder pipe 29.

In releasing the brakes after an automatic application, the double check valve 15 being at first held in its outer position by the brake cylinder pressure, air flows from the brake cylinder through passage 17 and pipe 4 to the triple valve exhaust port, but upon the brake cylinder pressure reducing to a certain low point, the double check valve 15 is caused to seat at its inner position by the spring 35 and the remaining air in the brake cylinder is released through passage 16, passage 13, past check valve 31, passage 30, pipe 24, and the exhaust port of the three-way cock 25. A safety valve 36 may be placed in the pipe 24 for limiting the pressure of fluid supplied to the brake cylinder in electric applications to a predetermined degree.

It will be noted that air is released from the brake cylinder through the usual triple valve exhaust both in automatic and electric operation, so that the time of release is the same in both cases, and the disposition of the electric release valve is such that the same may be of the normally closed type without in any way interfering with the operation of the apparatus in case of failure of current, as air is supplied to the brake cylinder in automatic application through a passage independent of said electric release valve.

Having now described my invention, what I claim as new and desire to secure by Letters Patent, is:

1. In an electro-pneumatic brake, the combination with a brake cylinder and a train signal line normally containing fluid under pressure, of an electrically controlled valve for supplying fluid from said signal line to the brake cylinder.

2. In an electro-pneumatic brake, the combination with a brake cylinder and an automatic valve device for controlling the admission and release of fluid to and from the brake cylinder, of an electrically operated release valve adapted to control a passage leading from the brake cylinder to the exhaust port of said automatic valve device, to thereby effect the electric release through said exhaust port exclusively.

3. In an electro-pneumatic brake, the combination with a brake cylinder and an automatic valve device adapted to supply and release air through a passage to and from the brake cylinder, of an electrically controlled release valve located in a by-pass communicating with said passage for electrically releasing air from the brake cylinder exclusively through the triple valve exhaust port.

4. In an electro-pneumatic brake, the combination with a brake cylinder and an automatic valve device adapted to supply and release air through a passage to and from the brake cylinder, of an electrically controlled release valve located in a by-pass communicating with said passage for electrically releasing air from the brake cylinder and a valve mechanism for establishing communication from the brake cylinder through said by-pass at one time and through said passage at another time.

5. In an electro-pneumatic brake, the combination with a brake cylinder and an automatic valve device adapted to supply and release air through a passage to and from the brake cylinder, of an electrically controlled release valve located in a by-pass communicating with said passage for electrically releasing air from the brake cylinder and a double check valve device having one position for establishing communication from the brake cylinder through said by-pass and another position for establishing communication from the brake cylinder through said passage.

6. In an electro-pneumatic brake, the combination with a brake cylinder and an automatic valve device adapted to supply and release air through a passage to and from the brake cylinder, of an electrically controlled release valve located in a by-pass communicating with said passage for electrically releasing air from the brake cylinder, a valve mechanism for connecting the brake cylinder with said by-pass in one position and with said passage in another position, and an electrically controlled application valve for supplying fluid to the brake cylinder through said by-pass.

7. In an electro-pneumatic brake, the combination with a brake cylinder and an automatic valve device for controlling the admission and release of fluid to and from the brake cylinder, of an electrically operated normally closed release valve adapted to control a passage leading from the brake cylinder to the exhaust port of said automatic valve device, to thereby electrically release air from the brake cylinder only through said exhaust port.

8. In an electro-pneumatic brake, the combination with a brake cylinder and an automatic valve device operated by variations in train pipe pressure for controlling the admission and release of fluid to and from the brake cylinder, of a normally closed electrically controlled valve for controlling a passage leading from the brake cylinder to the exhaust port of said automatic valve device for electrically releasing fluid from the brake cylinder through said exhaust port exclusively.

In testimony whereof I have hereunto set my hand.

WALTER V. TURNER.

Witnesses:
A. M. CLEMENTS,
W. W. MARTIN.

Copies of this patent may be obtained for five cents each, by addressing the "Commissioner of Patents, Washington, D. C."